(No Model.) 5 Sheets—Sheet 1.

C. B. WATTLES.
DEVICE FOR TRANSMITTING POWER.

No. 452,444. Patented May 19, 1891.

(No Model.) 5 Sheets—Sheet 2.

C. B. WATTLES.
DEVICE FOR TRANSMITTING POWER.

No. 452,444. Patented May 19, 1891.

(No Model.)   C. B. WATTLES.   5 Sheets—Sheet 4.
DEVICE FOR TRANSMITTING POWER.

No. 452,444.   Patented May 19, 1891.

(No Model.)　　　　　　　　　　　　　　　　　　5 Sheets—Sheet 5.
C. B. WATTLES.
DEVICE FOR TRANSMITTING POWER.

No. 452,444.　　　　　　　　　　　Patented May 19, 1891.

UNITED STATES PATENT OFFICE.

CYRA B. WATTLES, OF ELIZABETH, NEW JERSEY.

DEVICE FOR TRANSMITTING POWER.

SPECIFICATION forming part of Letters Patent No. 452,444, dated May 19, 1891.

Application filed August 15, 1890. Serial No. 362,062. (No model.)

*To all whom it may concern:*

Be it known that I, CYRA B. WATTLES, a citizen of the United States, residing at Elizabeth, Union county, New Jersey, have invented certain new and useful Improvements in Devices for Transmitting Power, fully described and represented in the following specification and the accompanying drawings, forming a part of the same.

The object of this invention is to provide a means for transmitting power from a motor moving with a constant force to a mechanism having a variable load, whereby a constant speed for the motor may be retained.

The invention consists, primarily, in a train of gears comprising two gears mounted independently of each other and an intermediate gear meshing therewith, one of such gears being driven by the motor and the speed of another being varied, being regulated by means connected with the motor-gear to affect the movement of the third. It also consists in a special arrangement for such mechanism.

The invention is especially adapted for street-cars, elevators, &c., operated by electric motors, in which the load carried is variable. Both in street-cars and in elevators this variation may be due to the overcrowding of the same with passengers, and in street-cars it would be due also to grades which occur at intervals.

The invention will be understood by reference to the annexed drawings, in which—

Figure 1:
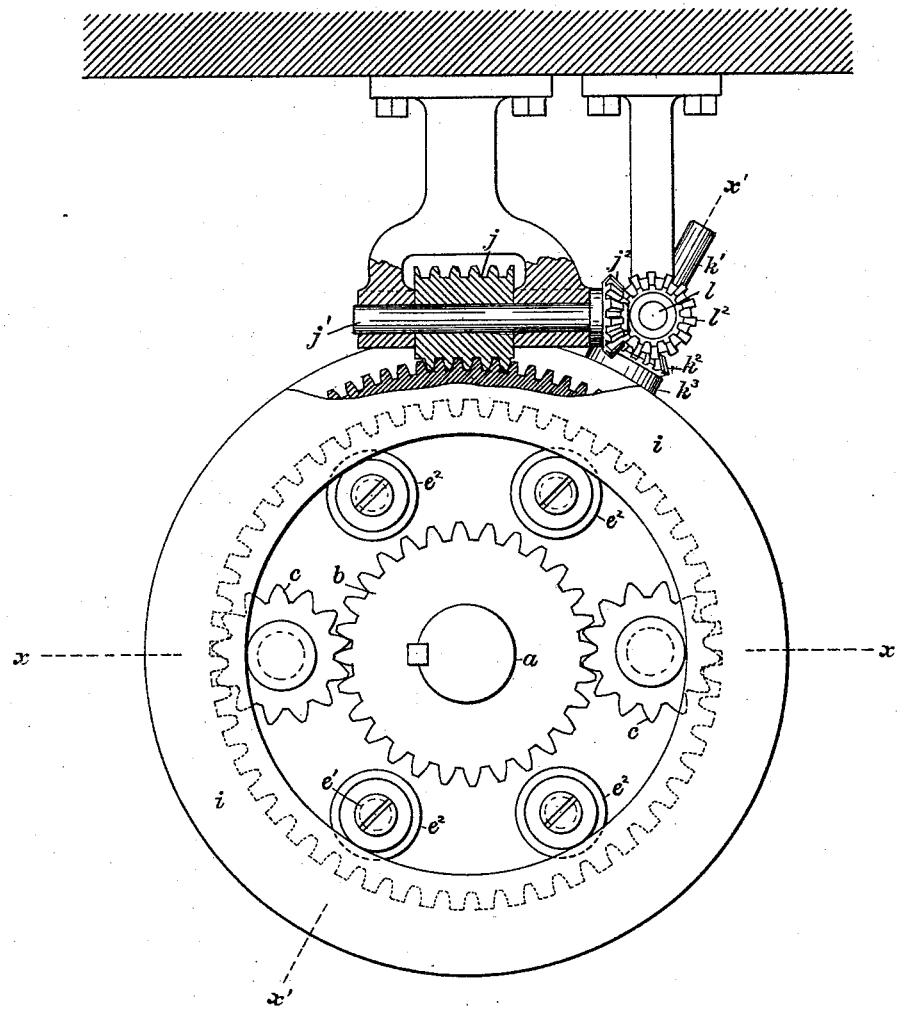
Figure 2:
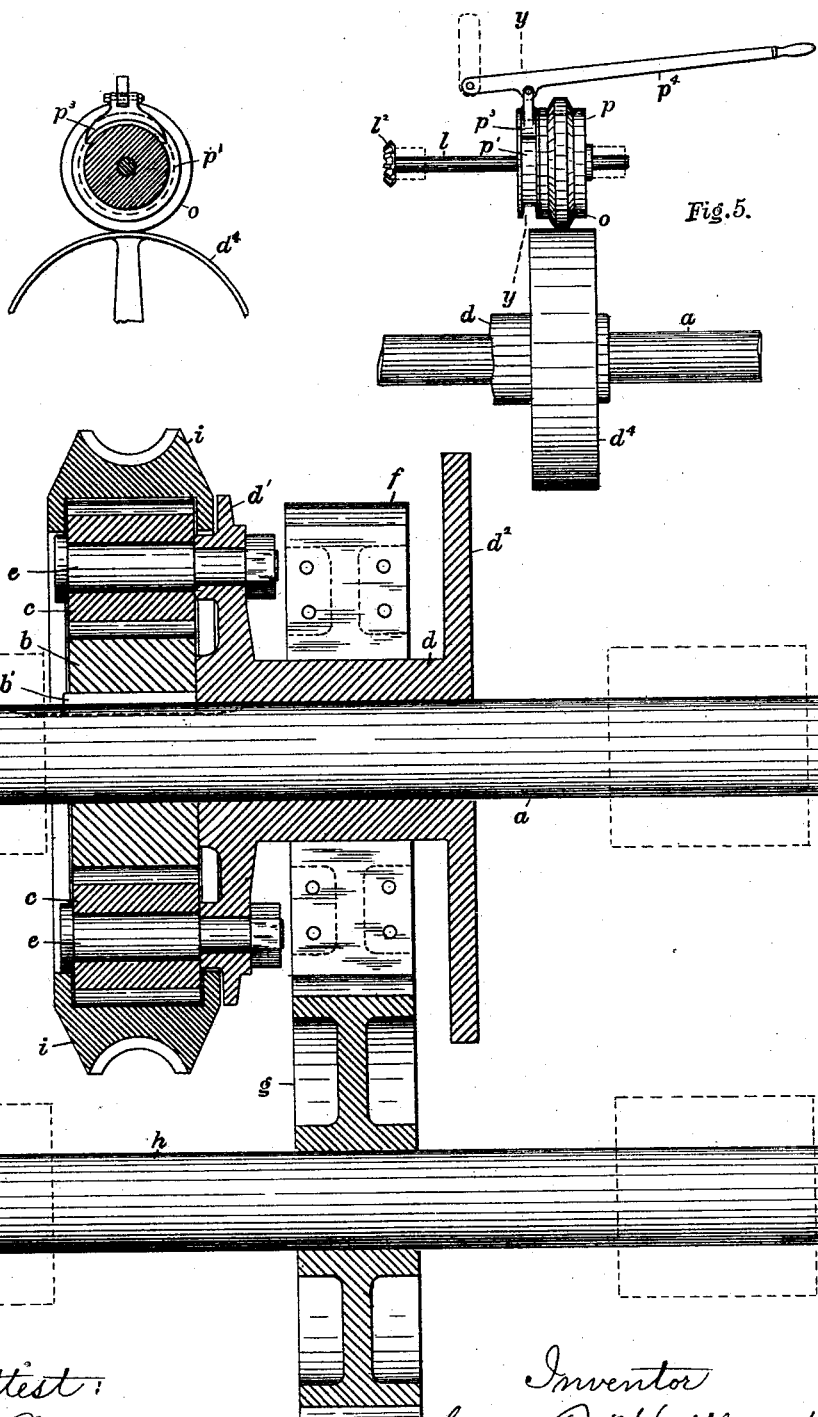
Figure 3:
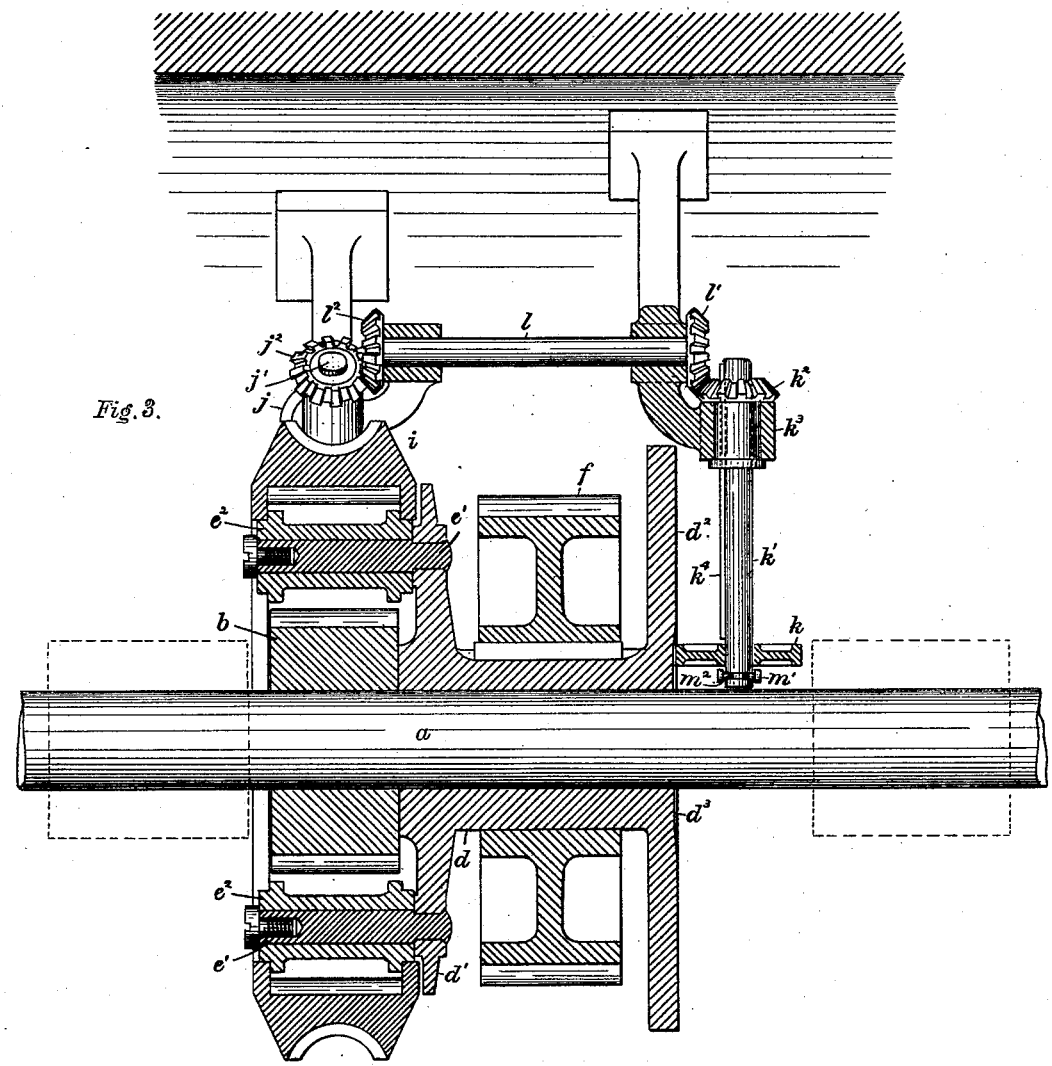
Figure 4:
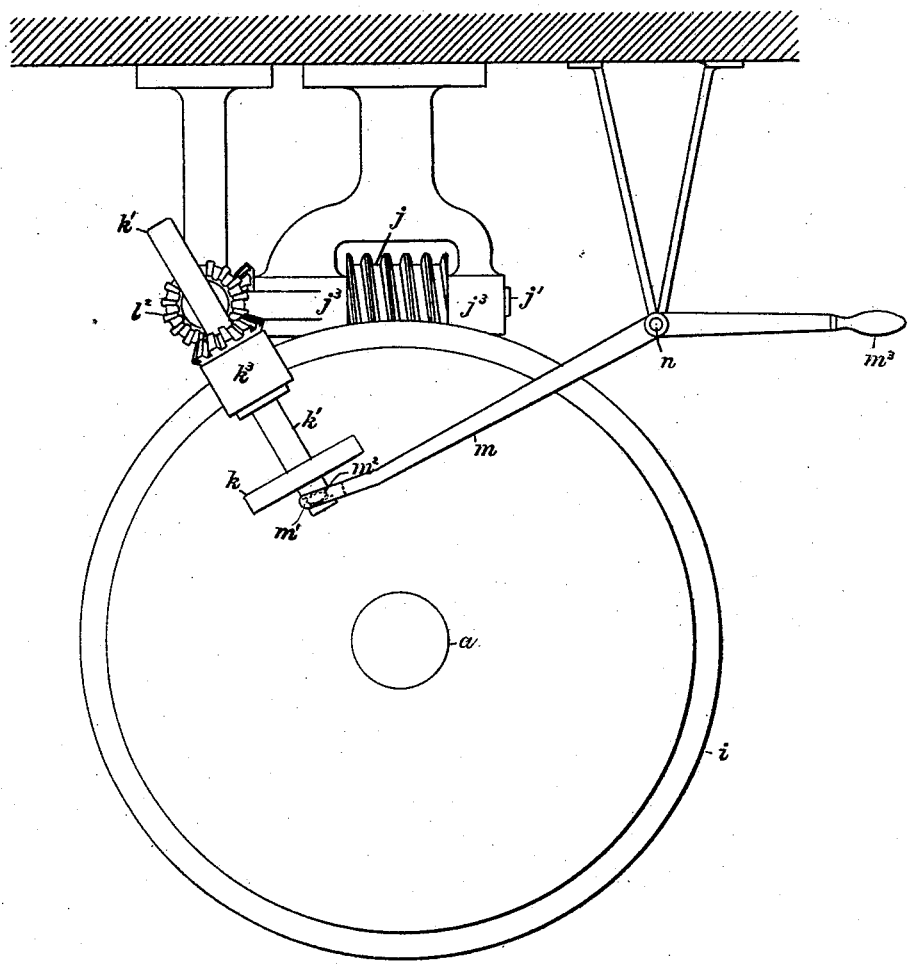
Figure 8:
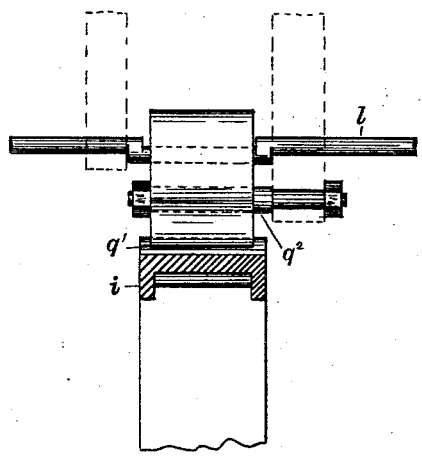
Figure 7:
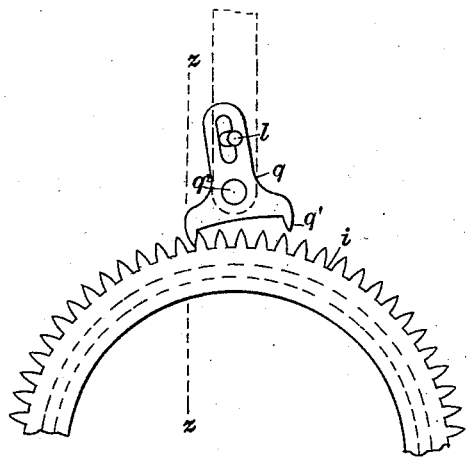

Figure 1 is a front elevation of a mechanism embodying my invention. Fig. 2 is a sectional plan on line $x\,x$ in Fig. 1. Fig. 3 is a sectional elevation on line $x'\,x'$ in Fig. 1. Fig. 4 is a rear elevation of the same. Fig. 5 is an elevation of an alternative means of varying the speed of one of the elements of the train of gearing, and Fig. 6 a sectional elevation of the same on line $y\,y$ in Fig. 5. Fig. 7 is an elevation showing another means of varying the speed of one of the members of the train than that shown in the preceding figures, and Fig. 8 is a sectional elevation of the same on line $z\,z$ in Fig. 7.

In Figs. 1 to 4, inclusive, $a$ is the shaft to which the transmitting train of gears is applied, and which operates the mechanism sustaining the load to be moved, and $b$ is a gear-wheel applied thereto and fixed thereon by means of the key $b'$.

$c\,c$ are two gear-wheels mounted upon a sleeve $d$ and meshing with the gear-wheel $b$. Such sleeve is mounted loosely upon the shaft $a$ to rotate independently of the same, and is provided at the end adjacent the gear $b$ with a flange $d'$, having the studs $e$ and $e'$ projecting therefrom to sustain the gears $c$ and the rollers $e^2$ for supporting the internal gear, respectively, and at its opposite end having a flat plate or disk $d^2$, provided, as shown in Fig. 3, with a flat depression $d^3$, adjacent to the shaft $a$.

$f$ is a split gear fixed upon the sleeve $d$ and meshing with a gear $g$ upon a shaft $h$, connected with the motor, the same operating to rotate the sleeve $d$ upon the shaft $a$ independently of the gear $b$.

$i$ is an internal gear encircling the gears $b$ and $c$ and meshing with the latter. The said gear $i$ is provided externally with worm-teeth meshing with the worm $j$ upon the worm-shaft $j'$, which is supported in the stationary bearings $j^3$.

$k$ is a friction-wheel fixed to a longitudinally-movable shaft $k'$ in contact with the surface of the circular plate or disk $d^2$, and adapted to roll upon such plate to rotate the shaft $k'$.

$k^2$ is a miter-gear secured in the bearing $k^3$ and fitted loosely to the shaft $k'$, having the spline $k^4$ to adapt the latter to slide longitudinally therein.

$l$ is a shaft provided at one end with a miter-gear $l'$, meshing with the miter-gear $k^2$ and rotated thereby, and provided at its opposite end with a miter-gear $l^2$, meshing with a miter-gear $j^2$ upon the worm-shaft $j'$ to rotate the worm $j$.

$m$ is a lever pivoted upon a fulcrum $n$ and provided with a fork $m'$ at its end inclosing the shaft $k'$, and provided with pins $m^2$, engaging an annular groove in the said shaft to shift the same radially to and from the periphery of the plate $d^2$.

$m^3$ is a hand-piece at the opposite end of the said lever, adapted to be grasped by the hand of the operator to alter the position of the movable shaft $k'$.

The device operates as follows: The gear $g$, which is driven at a uniform speed, communicates a similar motion to the sleeve $d$ by means of the gear $f$, thereby revolving the studs $e$, carrying the gears $c$ about the gear $b$, at a uniform speed. When the friction-wheel $k$ is over the depression $d^3$ in the plate $d^2$ and adjacent to the shaft $a$, being out of contact with the surface of the plate, it derives no motion from such revolving disk $d^2$ and does not operate therefore to drive the worm-shaft $j'$ and the worm $j$. The worm thus holds the internal gear $i$ stationary and the gears $c$ roll thereon, meshing with the gear $b$ and operate as intermediate gears to drive the gear $b$ at a greater speed than the sleeve $d$. When, however, the friction-wheel $k$ is shifted outward toward the periphery of the disk $d^2$, the worm $j$ is rotated thereby, thus causing the rotation of the revolving intermediate gears $c$ to be retarded and a consequent variation of the speed of the gear $b$ and shaft $a$, carrying the load. Thus, assuming the diameter of the gear $i$ to be twice that of the gear $b$ and four times that of the gears $c$, when the internal gear is stationary the gear $b$ will be driven at two and one-half times the velocity of the sleeve $d$, and when the gear $i$ is rotated at the same speed as the sleeve $d$ the gear $b$ will be driven at the same speed as the sleeve. The speed of the gear $b$ will be affected in like manner for other variations in the speed of the internal gear $i$ or for different proportions in the several elements of the train.

In Figs. 5 and 6 I have shown a different form of friction device for operating the worm $j$. This consists in a pulley $p$, provided at one end with a friction-ring $o$, fitted loosely thereto and having its periphery in contact with a pulley $d^4$, mounted upon the sleeve $d$, and at its other end having a groove $p'$, in which is fitted a brake-shoe $p^3$, operated by means of a lever $p^4$. With such construction the pulley $d^4$, which rotates with the sleeve $d$, operates to rotate the friction-ring $o$ continuously. The pulley $p$ is rotated by the contact of the interior of the ring $o$ with its periphery. When downward pressure is applied to the lever $p^4$, the friction of the brake-shoe operates to retard or check the movement of the pulley $p$, while the rotation of the friction-ring $o$ is unchanged. It is evident that the motion of the worm may by this means be retarded, as desired, by varying the pressure applied to the brake-lever $p^4$.

It is obvious that the gears $c$ and supporting-rolls $e^2$, which revolve in contact with the internal gear $i$, will tend to rotate the latter at the same speed at which they are revolved around the gear $b$. It will therefore be seen that in order to reduce the speed of the internal gear it is necessary to apply merely a suitable braking device directly thereto, and that no positive means for altering the speed is absolutely necessary, although I consider the employment of such means as the worm $j$ preferable.

In Figs. 7 and 8 I have shown a means of varying the speed of the internal gear $i$, consisting in a clock-escapement. The internal gear is provided externally with teeth meshing with the teeth $q'$ upon the vibrating lever $q$, which is mounted upon a stud $q^2$. The intermediate shaft $l$ is provided at the end adjacent to the worm-wheel with a crank passing through a slot in the lever $q$ to give it the necessary vibration, and its operation may be varied by means of the friction device shown in Figs. 1 to 4, inclusive, or that shown in Figs. 5 and 6.

By reference to the various forms of my invention shown in the drawings it will be seen that any one of the three elements in the train of gearing may be the driver, and either of the others may be the means for varying the speed of the third, the regulating device being in any case connected with the primary or driving member of the train and applied to another member to affect the movement of the third member.

It is evident that the amount of variation in the speed of the worm will be determined by the diameter of the disk $d^2$ or of the pulley $d^4$, applied to the sleeve $d$, and that if the worm is rotated with sufficient speed to drive the worm-wheel $i$ with greater velocity than the sleeve $d$ the gears $c$ upon their respective studs may be reversed, and thus drive the shaft $b$ in the opposite direction from the sleeve. When the plate $d^2$ upon the sleeve $d$ is located at the end of the shaft $a$ to permit the movement of the friction-wheel $k$ below the center of the plate, the motion of such friction-wheel will be reversed, and thus operate through the worm $j$ to drive the internal gear $i$ in the opposite direction from the sleeve $d$, and thus through the gears $c$ to drive the gear $b$ at a greater speed than the sleeve $d$.

I have shown the worm $j$ and the vibrating lever $q$ operated by a friction device, as the the power required to drive the same is very slight in comparison with that required to drive the essential element of the train, and the device shown herein for such purpose is therefore well adapted to perform the function for which it is designed.

It is obvious that the compactness and general arrangement of my train of gearing permit of the inclosure of the several gears in a suitable casing containing oil.

From the above description it will be seen that the essential feature of my invention is a regulating device connected with two of the members of a train of differential gearing composed of three members to govern the movement of the third member, and is therefore independent of the particular form of differential gearing to which such regulator may be applied.

Having thus set forth the nature of my invention, what I claim herein and desire to secure by Letters Patent, is—

1. The combination, with a train of differential gearing comprising two gears mounted concentric with and independent of each other and an intermediate gear meshing therewith and adapted to revolve in a path concentric with the same, of means for driving the primary member of the train, and means connected with such primary member for regulating the movement of another to effect the movement of the third, substantially as and for the purpose set forth.

2. The combination, with a train of differential gearing comprising two gears mounted concentric with and independent of each other and an intermediate gear meshing therewith and adapted to revolve in a path concentric with the same, of means for driving the primary member of the train, worm-teeth applied to another of the members, a worm meshing with the said worm-teeth, and means connected with the primary member of the train for driving the worm to effect the movement of the third member, substantially as and for the purpose set forth.

3. The combination, with the shaft $a$, having the gear $b$ fixed thereon, of the sleeve $d$, having studs adjacent the gear $b$, provided with gears $c$, meshing with the gear $b$, an internal gear $i$, inclosing the said gears $c$ and meshing therewith, and provided with worm-teeth upon its exterior, the worm $j$, meshing with the worm-teeth upon the internal gear $i$, a friction device applied to the sleeve $d$ and operated thereby to drive the worm $j$ at variable speeds, and means for driving the sleeve $d$ at a uniform speed, substantially as shown and described.

4. The combination, with the shaft $a$, having the gear $b$ fixed thereon, of the sleeve $d$, mounted loosely upon the said shaft and having studs $e$ adjacent the gear $b$, provided with gears $c$, meshing with the gear $b$, and having at its opposite end a disk $d^2$, an internal gear $i$, inclosing the said gears $c$ and meshing therewith, and provided with worm-teeth upon its exterior, the worm $j$, meshing with the worm-teeth upon the internal gear $i$, the friction-wheel $k$, adapted to roll in contact with the disk $d^2$ and adjustable radially thereon, means, substantially as described, for connecting the friction-wheel $k$ with the worm $j$ to operate the same, and means for driving the sleeve $d$ at a uniform speed, substantially as herein set forth.

5. The combination, with the shaft $a$, having the gear $b$ fixed thereon, of the sleeve $d$, mounted loosely upon the said shaft and having studs $e$ adjacent the gear $b$, provided with gears $c$, meshing with the gear $b$, and having at its opposite end a disk $d^2$, provided with a shallow recess $d^3$ adjacent its center, an internal gear $i$, inclosing the said gears $c$ and meshing therewith, and provided with worm-teeth upon its exterior, the worm $j$, meshing with the worm-teeth upon the internal gear $i$, the friction-wheel $k$, adapted to roll in contact with the disk $d^2$ and adjustable radially thereon, means, substantially as described, for connecting the friction-wheel $k$ with the worm $j$ to operate the same, and means for driving the sleeve $d$ at a uniform speed, substantially as herein set forth.

6. The combination, with the shaft $a$, having the gear $b$ fixed thereon, of the sleeve $d$, mounted loosely upon the said shaft and having studs $e$ adjacent the gear $b$, provided with gears $c$, meshing with the gear $b$, and studs $e'$, sustaining the supporting-rollers $e^2$, and having at its opposite end a disk $d^2$, provided with a shallow recess $d^3$ adjacent its center, an internal gear $i$, supported by the said rollers $e^2$ and inclosing the said gears $c$ and meshing therewith, and provided with worm-teeth upon its exterior, the worm $j$, meshing with the worm-teeth upon the internal gear $i$, the friction-wheel $k$, adapted to roll in contact with the disk $d^2$ and adjustable radially thereon, means, substantially as described, for connecting the friction-wheel $k$ with the worm $j$ to operate the same, and means for driving the sleeve $d$ at a uniform speed, substantially as herein set forth.

In testimony whereof I have hereunto set my hand in the presence of two subscribing witnesses.

CYRA B. WATTLES.

Witnesses:
 FOSTER M. VOORHEES,
 HENRY J. MILLER.